US009092918B2

(12) United States Patent
Courouble et al.

(10) Patent No.: US 9,092,918 B2
(45) Date of Patent: Jul. 28, 2015

(54) CONTACTLESS BIOMETRIC AUTHENTICATION SYSTEM AND AUTHENTICATION METHOD

(75) Inventors: Benoît Courouble, Hem (FR); Eric Mullie, Sailly-lèz-Lannoy (FR); Cédric Hozanne, Lorgies (FR); Chekib Gharbi, Quievrechain (FR); Jacques Estienne, Magny-les-Hameaux (FR)

(73) Assignee: NATURAL SECURITY, Lille (FR)

( * ) Notice: Subject to any disclaimer, the term of this patent is extended or adjusted under 35 U.S.C. 154(b) by 717 days.

(21) Appl. No.: 12/682,263

(22) PCT Filed: Oct. 17, 2008

(86) PCT No.: PCT/FR2008/001470
§ 371 (c)(1),
(2), (4) Date: Jul. 15, 2010

(87) PCT Pub. No.: WO2009/087311
PCT Pub. Date: Jul. 16, 2009

(65) Prior Publication Data
US 2010/0277278 A1 Nov. 4, 2010

(30) Foreign Application Priority Data
Oct. 19, 2007 (FR) ...................................... 07 07331

(51) Int. Cl.
*G06F 7/00* (2006.01)
*G07C 9/00* (2006.01)
*G06F 21/32* (2013.01)
*G06Q 20/34* (2012.01)
*G06Q 20/40* (2012.01)
*G07F 7/10* (2006.01)

(52) U.S. Cl.
CPC ............ *G07C 9/00087* (2013.01); *G06F 21/32* (2013.01); *G06Q 20/341* (2013.01); *G06Q 20/4014* (2013.01); *G06Q 20/40145* (2013.01); *G07F 7/1008* (2013.01)

(58) Field of Classification Search
CPC .......... G06Q 20/40145; G06Q 20/341; G06Q 20/40; G06Q 20/00; G06Q 20/04; G07C 9/00087; G07F 7/1008
USPC ................. 340/1.1, 5.1, 5.8–5.83, 10.1–10.6, 340/572.1–572.9; 235/375–385
See application file for complete search history.

(56) References Cited

U.S. PATENT DOCUMENTS 7,225,331 B1 * 5/2007 McBrearty et al. ........... 713/158
2007/0159302 A1 * 7/2007 Park ............................. 340/10.2

FOREIGN PATENT DOCUMENTS

| EP | 0794678 A | 9/1997 |
| WO | 2004/012233 A | 2/2004 |
| WO | 2005/078647 A | 8/2005 |
| WO | WO 2005078647 A1 * | 8/2005 |
| WO | 2007/100709 A | 9/2007 |

* cited by examiner

*Primary Examiner* — James Yang
(74) *Attorney, Agent, or Firm* — Seyfarth Shaw LLP; Brian Michaelis

(57) ABSTRACT

A system of authentication is provided including several personal authentication devices, one terminal including biometric means so arranged as to generate biometric information on the user, wireless communication means so arranged as to transmit biometric information without contact between each personal authentication device and the terminal, each personal authentication device including a memory so arranged as to store biometric data, processing means so arranged as to compare the biometric information and the biometric data, the wireless communication means being so arranged as to transmit biometric information to a plurality of personal authentication devices, each being arranged as to transmit, without contact, to the terminal, positive authentication data in the case of the authentication of the user and wherein the terminal being arranged as to open a transactional session only with the personal devices having transmitted the positive authentication data.

14 Claims, 4 Drawing Sheets

CONTACTLESS BIOMETRIC AUTHENTICATION SYSTEM AND AUTHENTICATION METHOD

RELATED CASE INFORMATION

This application claims benefit of PCT Application No. PCT/FR2008/001470, filed Oct. 17, 2008 which claims benefit of French application Ser. No. 07/07331 filed Oct. 19, 2007 both of which are incorporated herein in their entireties.

FIELD OF THE INVENTION

The invention relates to an authentication system including one of several personal authentication devices, one terminal including biometric means so arranged as to generate biometric information on the user, communication means so arranged as to transmit biometric information to the personal authentication device, the or each possible personal authentication device including a memory so arranged as to store biometric data on the holder of the personal authentication device, processing means so arranged as to compare the biometric information and the biometric data so as to perform an authentication of the user.

BACKGROUND OF THE INVENTION

Such a system is known from the application PCT WO-A-2004/100083. In this PCT application, the device is an authentication card and biometric information are transmitted to the memory of the authentication card. The PCT application does not teach how the biometric information is transmitted to the authentication card. Now, when the terminal is so arranged as to transmit the biometric information to the card for example by inserting the card into the terminal, the authentication requires a step having constraints for the user. The latter must take his or her card out and insert it into a contact reader so that identification can be performed.

One aim of the invention is to facilitate the authentication of the user in the above-mentioned system.

The document WO 2005/078647 teaches a system as described hereabove, wherein the communication means are wireless communication means, so arranged as to transmit biometric information to the personal device, without any contact, between the device and the terminal.

However, the document WO 2005/078647 does not take into account the fact that several personal devices can be located within the range of the wireless communication means.

As a matter of fact, this document is limited to a link of the one to one (1:1) type between a unique personal device and the terminal, which imposes that the user must place a unique personal device close to the device to implement the method. Now, it is advantageous that the method can be implemented when several personal devices are within the reach of the terminal, more particularly when the range of the communication means is relatively significant, for example between 50 centimetres and 300 centimetres

SUMMARY OF THE INVENTION

More particularly, a personal device can be selected by several terminals simultaneously, for example if the environment is that of a department store wherein several terminals exist together. Similarly, the terminal can have in itself several cards belonging or not to different bearers.

One aim of the invention is to provide a method and a system of authentication likely to be operated when the wireless communication means have a relatively significant range, so that several personal devices can be located within the range of such wireless communication means.

This aim is reached according to the invention thanks to a system such as described hereabove, wherein wireless communication means are so arranged as to transmit biometric information to a plurality of personal authentication devices, with each one of the personal authentication devices including wireless communication means so arranged as to transmit, without contact, to the terminal positive authentication data in the case of a positive comparison between the biometric information and the biometric data enabling the authentication of the user, and wherein the terminal is so arranged as to open a transactional session only with the personal device or devices having transmitted the positive authentication data.

Therefore, the terminal can send the biometric information to all personal devices within the range of its wireless communication means and open a transactional session only with the devices positively answering the polling from the terminal. Then, if several devices are within the range of the terminal wireless communication means, but do not correspond to the user having performed the biometric acquisition, no transactional session will be opened with the terminal. The presence of several personal devices within the range of the terminal can thus be managed. This makes it possible to have a satisfactory and secured authentication even when several devices are present.

Therefore, the user can authenticate himself or herself with one gesture using the biometric means of the terminal without having to handle his or her own personal authentication device. For example, when the personal authentication device is in the form of an authentication card, the user can authenticate himself or herself without taking out the card, for example from his or her purse, and the card will perform the comparison of the biometric information with the biometric data in the memory without the card being handled by the bearer. Then, the authentication is facilitated while maintaining a satisfactory safety level for the authentication thanks to a biometric comparison, and while taking into account the fact that several users can be located within the range of the terminal. The invention is thus particularly well adapted to the case of a department store where several users can simultaneously go to the pay desk or to the case where one or several users hold several personal devices.

We will now describe advantageous embodiments of the invention.

Preferably, the terminal wireless communication means are so arranged as to transmit biometric information to the personal authentication device according to the distance contained between 50 centimetres and 300 centimetres.

Thus, the user does not have to place his or her personal authentication device closer, as in the contactless solutions using the NFC "Near Field Communication" standard which enables only the communications at a few centimetres in One to One mode.

Similarly, the wireless communication means of the personal authentication device are also preferably so arranged as to communicate with the terminal according to a distance contained between 50 centimetres and 300 centimetres.

According to one embodiment of the invention, the biometric means include a biometric reader so arranged as to acquire a biometric image of the user and processing means so arranged to generate biometric information from the biometric image. This embodiment has the advantage of making it possible to adapt the biometric information transmitted to the storage and calculation capacities of the personal authentication device. More particularly, the processing means can be such that only small-sized biometric information are transmitted to the personal authentication device, so long a positive comparison with the data stored in the personal authentication device guarantees the identity of the user having used the biometric reader with enough security. Such a security level can be for example adopted as a function of the applications of the invention and the type of transaction authorized by the terminal.

More particularly according to a particular embodiment of the invention, the processing means are so arranged as to retrieve minutiae from a biometric image and biometric information include a condensate of the minutiae. This condensate is for example carried out using a hashing function which can be applied at the terminal and the personal authentication device.

Preferably, the biometric reader is so arranged as to acquire an image of the venous network of a finger or of the hand of the user. This more particularly makes it possible to provide a biometric characteristic without a track of the user.

According to one embodiment of the invention, the personal authentication devices can have a first mode wherein they are not likely to transmit data to a terminal and an active mode wherein they are likely to communicate with the terminal.

In this case, in case of a negative comparison between the biometric information and the biometric data in a personal device, such personal device can be so arranged as to switch to the first mode, so that no communication session is opened between the terminal and such personal device.

Preferably, in case of a positive comparison between the biometric information and the biometric data in a personal device, such personal device is so arranged as to remain in active mode so that no transaction can be performed between the terminal and the personal device.

The personal devices can further have a listening mode where in they are likely to detect a signal transmitted by the terminal and a standby mode wherein they are only likely to run a time delay.

In this case, the personal devices can be so arranged as to switch from the standby mode to the listening mode after a first predetermined time $T_1$.

The personal devices can further be so arranged as to switch from the listening mode to the active mode when they detect said signal transmitted by the terminal prior to the end of the second predetermined time $T_2$.

In all the embodiments mentioned above, in case of the reception by the terminal of positive authentication data from a plurality of personal devices, the terminal can be so arranged as to select a unique personal device to perform a transaction.

In this case, the personal devices may include applications, and the terminal can be so arranged as to select the unique personal device as a function of the applications included in the plurality of the personal devices having transmitted the positive authentication data.

Similarly, the personal devices having transmitted the positive authentication data can include a plurality of applications and the terminal can be so arranged as to select a unique application to carry out one transaction.

In this case, the terminal can be so arranged as to select the unique application as a function of a rule of priority or as a function of the applications which it is able to recognize.

In all the embodiments mentioned above, the terminal wireless communication means and the wireless communication means of the personal device or each personal device can have a communication range contained between 30 centimetres and 300 centimetres.

The invention also relates to an authentication method implementing a system as described above, with the method including steps wherein the user uses the biometric means so as to generate biometric information, the wireless communication means transmit the biometric information to a plurality of personal authentication devices. The processing means of each of the personal devices compare the biometric information and the biometric data and generate a positive authentication data in the case of a positive comparison between the biometric data and the biometric information so as to authenticate the user, the wireless communication means of the personal device is transmitted to the terminal for the positive authentication of data. The terminal opens a transactional session only with the personal device or devices having transmitted the positive authentication data.

According to an embodiment of the method mentioned above, the personal authentication device can further transmit at least one identifier associated with at least one application likely to be implemented by the personal authentication device.

Thus it can be guaranteed that the transaction performed between the terminal and the personal device is adapted to the capability of the personal device defined by the applications.

Preferably, the terminal wireless communication means can transmit biometric information to the plurality of personal authentication devices via a previously established secured communication channel.

BRIEF DESCRIPTION OF THE DRAWINGS

Now at least one embodiment of the invention will be described while referring to the appended figures wherein.

DETAILED DESCRIPTION OF THE INVENTION

Figure 1:
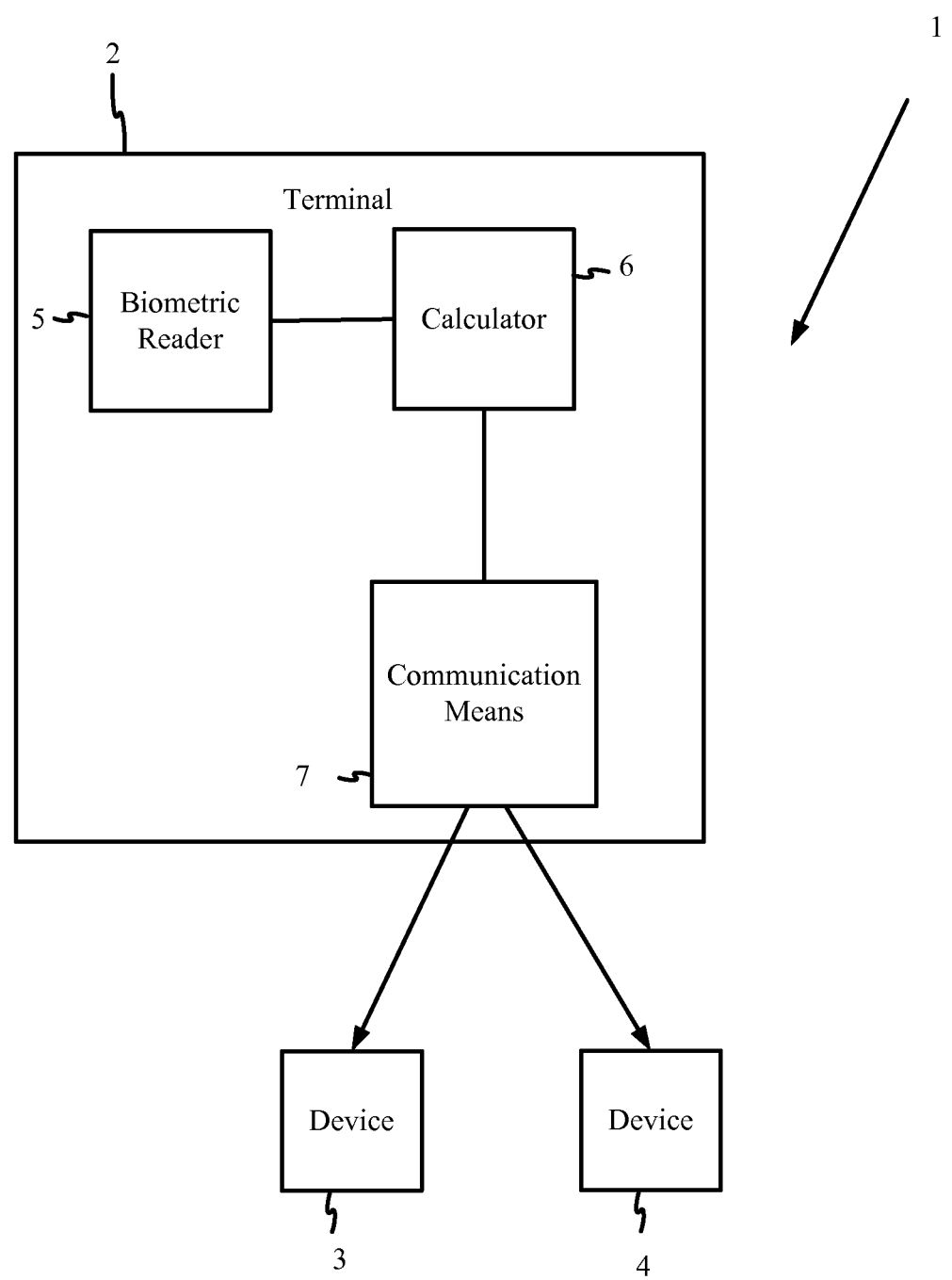
FIG. 1 shows an authentication system according to the invention.

As illustrated in FIG. 1, an authentication system 1 according to the invention includes a terminal 2 for example corresponding to a terminal 2 in a point of sale in a store. The terminal 2 includes a biometric reader 5 likely to acquire a biometric image of a user, for example a reader for acquiring an image of the venous system of a finger or the hand of the user, so as to calculate the minutiae of the image. The terminal 2 also includes a calculator 6 to apply a processing to the biometric image and to the minutiae obtained. The processing corresponds for example to the application of a hashing function to generate a condensate of the minutiae. The terminal 2 also includes wireless communication means 7 to transmit information to personal authentication devices 3 and 4. Such devices 3 and 4 are described in greater details subsequently.

The wireless communication means 7 include a radiofrequency module based on ISO standards, more particularly ISO 18000-6. Such standard make it possible to have a wireless communication on a distance contained between 50 centimetres and 3 meters. For the ISO standard 18000-6, the frequency used is an ultrahigh frequency within the 865 MHz band. Such a frequency is well suited for communications on distances contained between 50 centimetres and 3 meters.

The wireless communication means 7 further integrate an anti-collision algorithm so that the terminal 2 can converse with a plurality of devices 3 and 4.

Figure 2:
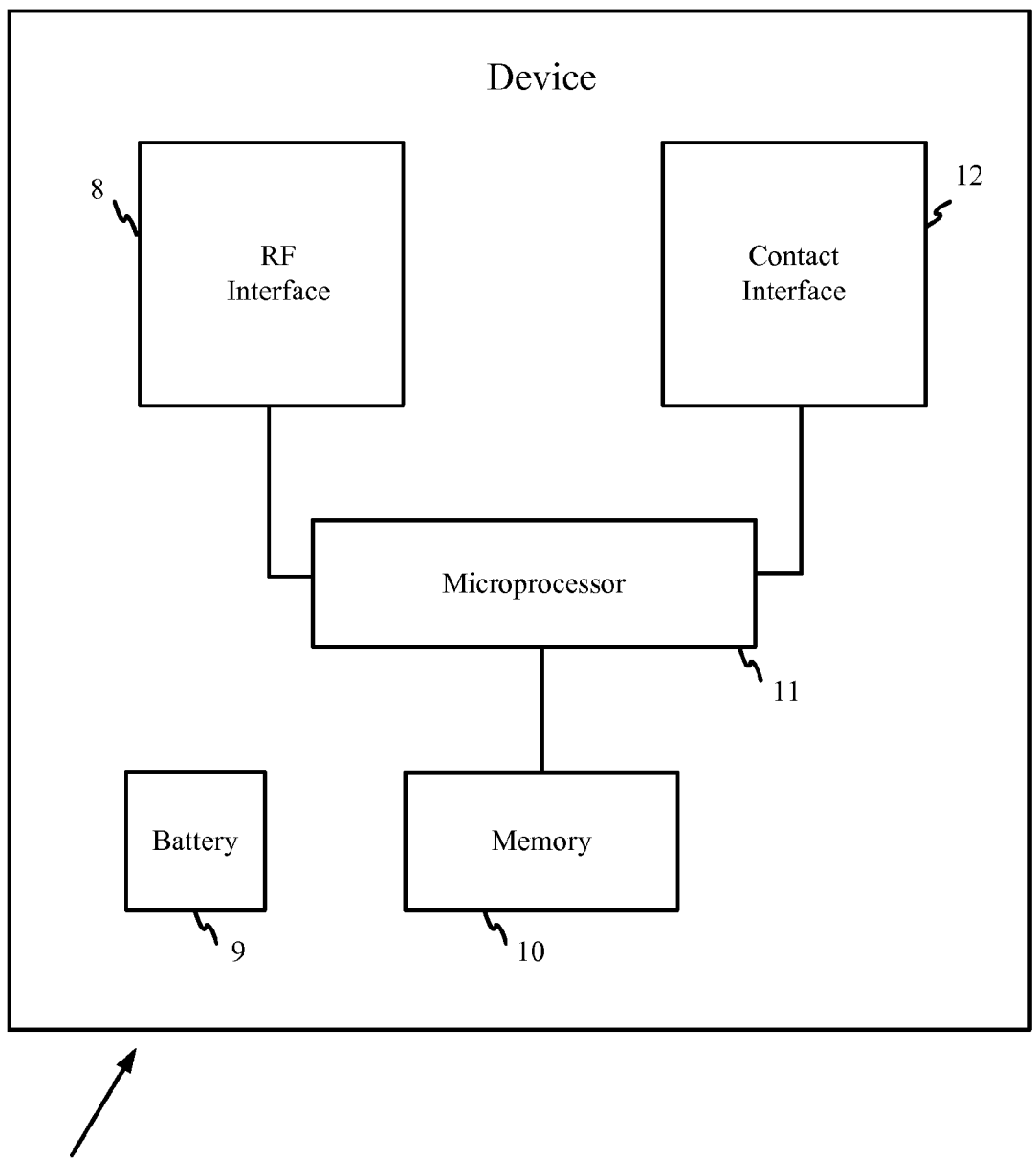
FIG. 2 shows a personal device included in the fixed authentication system of FIG. 1.

Now, the device 3 will be described in greater details while referring to FIG. 2. The device 3 is for example a card having the shape of a payment card. It includes a radiofrequency interface 8 connected to a microprocessor 11, as well as a contact interface 12 also connected to the microprocessor 11. The microprocessor 11 is connected to an EEPROM memory 10. A battery 9 makes it possible to supply the radiofrequency emission power required by the device 3 so that it can converse with the terminal 2. Battery 9 can be eventually reloaded upon a contact of the interface 12 with a contact card reader.

The memory 10 stores biometric data on the card 3 holder. Such biometric data can be adapted to the information likely to be generated by the terminal 2. More particularly if the terminal 2 includes a reader to acquire an image of the venous network of a user's finger, the memory 10 includes biometric data required for authenticating the user when information from such an image of the venous network of the finger are received by the device 3. Such data can correspond to data on the minutiae of the venous network or to a condensate of such an image for example obtained from a hashing function similar to the one applied at the terminal 2.

Such data can also correspond to the data relating to the iris or to the shape of the face, so as to enable recognition of such biometric components or any other biometric element or combinations of several biometric elements.

This biometric gauge is recorded on a client's card 3 upon his/her subscription, the renewal of his/her card or the creation of a new card for an existing client.

The microprocessor 11 is programmed to make comparisons between the biometric data stored in the memory 10 and the biometric information received from the terminal 2 via the radiofrequency interface 8.

By definition, such comparison is of the One to One (1:1) type: it only relates to making sure that the biometric sample supplied corresponds to the gauge existing in the personal authentication device 3 that the bearer has (chip card, SIM card of a cellular phone, . . . ). This is opposed for example to a One to Any (1:N) type wherein the corresponding gauge is searched for in a data base.

In case of a positive comparison between the biometric data stored in the memory 10 and the biometric information received from the terminal 2 via the radiofrequency interface 8, the device 3 transmits to the terminal 2 positive authentication data to indicate to the terminal 2 that the user having used the biometric reader is really the device 3 holder.

Now, the operation of the system 1 described hereabove will be described while referring to FIG. 3. The authentication of the user in a particular embodiment of the invention will be described subsequently while referring to FIG. 4.

When the user wishes to pay a given amount at a pay desk 13, the pay desk system 13 transmits 20 the amount to the terminal 2. The terminal 2 then displays for example a message so that the user places his or her finger or his or her hand onto the biometric reader. When biometric information is generated by the terminal 2, the latter sends 30 such biometric information to devices in its environment. Such biometric information is then received by all the personal devices 3 and 4 within the transmission range of the terminal 2. Upon reception of such biometric information, the device 3 compares 41 the biometric information received and the biometric data stored within its memory. The device 4 also performs 42 such a comparison.

Figure 3:
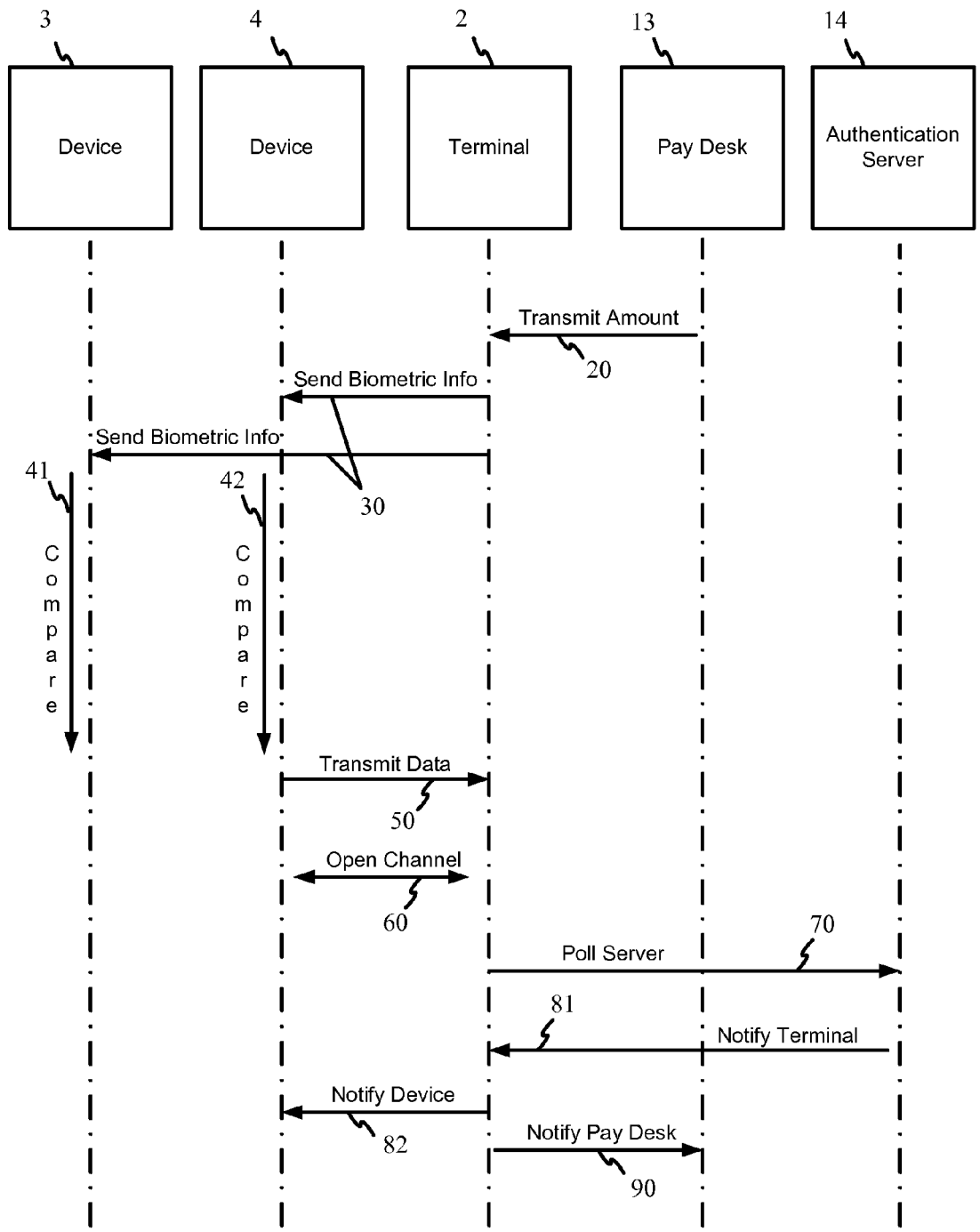
FIG. 3 shows a functional diagram of the authentication system of FIG. 1.

It is assumed that in FIG. 3, the device 4 holder is the user having used the biometric reader of the terminal 2 and that the holder of the device 3 is not the user having used the biometric reader in the terminal 2. In this case, the comparison performed by the device 3 gives a negative result and no authentication data is transmitted by the device 3 to the terminal 2. The device 3 will then remain silent for the transaction with the terminal. On the contrary, the comparison made by the device 4 gives a positive result, and the device 4 transmits 50 positive authentication data to the terminal 2, so as to inform the terminal 2 that the user having used the biometric reader of the terminal 2 is the authentic holder of the personal authentication device 4.

When the authentication is completed, a secured transactional channel is opened 60 between the terminal 2 and the device 4. A secure transaction can then be performed on this secure transactional channel. Thanks to the wireless communication means 2 and the device 4 mentioned above, the authentication can thus be performed whereas the device 4 remains inside the purse, the wallet or the pocket of a holder of the device. The secured transaction is then implemented in a way known per se between the terminal 2 and the device 4 for example using certificates of the PKI type, public keys and private keys.

For an electronic payment transaction for example of the EMV type, the terminal 2 polls 70 an electronic payment authentication server 14 to perform the transaction EMV. The performance of the transaction is then notified 81 to the terminal 2 which shall in turn notify 82 the device 4 that the transaction has been completed.

The terminal 2 also notifies 90 to the pay desk system that the transaction has been completed.

When the transaction is completed, the secure communication between the terminal 2 and the device 4 is complete.

Now, alternative solutions of the above-mentioned embodiments will now be described.

The same user may be the holder of several personal devices 3 or 4, for example in the form of several cards such as previously described.

Then, in the previously described method while referring to FIG. 3, all the devices for which the user is the holder will perform a positive comparison and transfer to the terminal 2 the positive authentication data. In this case, the terminal 2 can be so arranged as to enable a selection of the various devices having positively answered the comparison. This selection can be automatically performed by the terminal 2 as a function of the compatibility between the terminal 2 and the device or devices having made a positive answer to the comparison.

For example, if the terminal 2 is a terminal of the EMV type and only one of the devices is likely to perform transactions according to the standard EMV, the terminal 2 will automatically select this device and will open the secure transactional channel with such device.

For this purpose, the devices having made a positive answer to the comparison are so arranged as to transmit to the terminal 2, for example with the positive authentication data, the identifiers of the application likely to be implemented by the device. Similarly, the terminal 2 can, during the exchanges thereof with the device, transmit identifiers of the services it can carry out.

In addition, when the same personal authentication device includes a plurality of applications, one identifier of such applications is transmitted together with the positive authentication data, so that the terminal can determine the service that can be provided as a function of the applications available on the device.

In addition, the fact that the personal authentication device 3 and 4 could have the shape of a payment card has been described. It should be understood that such device can also be inserted into a cellular phone, more particularly in the SIM card of such a cellular phone or in a simple key chain or any other support.

In addition, according to one embodiment of the invention, the biometric reader 5 and the wireless communication means 7 of the terminal 2 can be inserted into a case likely to be connected to a personal computer, for example using a USB connection. Therefore, a user wishing for example to make a secure payment on the Internet can connect the case to his or her personal computer and authenticate himself or herself using the biometric reader 5 of the case, still without taking his or her personal authentication device out thanks to the wireless communication between the terminal 2 and the personal authentication device 3.

The terminal 2 can be used to perform all kinds of transactions requiring the authentication of a user and more particularly a payment by the user or a distribution of service to this user.

More particularly, an exemplary terminal 2 associated with a pay desk system in a store such as a super market is described. The terminal may include a processor to carry out the required processing, a temporary storage memory, an alphanumeric display, a keyboard, a credit card slip printout, software modules such as the selection of the application, the setting, and the transmission of alarms.

This terminal 2 is connected to an authorization bank server and with a pay desk for example, such as described hereinunder.

This pay desk may include more particularly a man-machine interface with the pay desk personnel, a check printer, a ticket printer, an alphanumeric display, a barcode scan, software modules for calculating the amount and selecting the payment method, a pay desk keyboard.

This pay desk system is connected with the terminal 2 and with the central system in the store.

An embodiment of the personal device 3 in the form of a card 3 will now be described. In this embodiment, the card 3 includes a CPU processor, a memory, a wake-up device, the operation of which is described hereinunder, a so-called private manual control or "privacy", which makes it possible for the user to totally cut off the card supply (privacy mode) or to supply it again, a power supply, software modules executed on the card for example the detection of a signal, the management of the applications.

Now the transmission channel between the cards 3 and the terminal 2 will be described in greater details.

The transmission channel more particularly includes a contactless communication channel including radio communication circuits on the card 3 and on the terminal 2, communication interfaces with contact on the card 3 and on the terminal 2; software modules executed on the card 3 and on the terminal 2 for example in the form of communication drives with contact or without contact.

This transmission channel awakes the cards 3, provides the emission and reception of data, and the opening and closing of a secured communication channel.

The system according to the invention further includes an electronic payment and services subsystem to provide payment transactions and more particularly any service transaction. This subsystem more particularly manages the relation with the bank server.

The electronic payment and services subsystem is composed of software components executed on the cards 3 and on the terminal 2.

It more particularly performs the functions of authorizing or denying the payment, implementing the payment transaction and more particularly implementing the service transactions.

Preferably, the system according to the invention further includes a safety subsystem aiming at protecting the clients, retailers and service providers against possible fraud, impersonation and transaction made without the authorization thereof, functions of authentication, confidentiality, integrity (non-alteration) and non-repudiation). This security subsystem includes software components executed on the cards 3 and the terminal 2 and if required specialized cryptographic circuits.

The subsystem makes it possible to cipher or decipher biometric data, an authentication of a card 3 relative to the terminal 2, an optionally an authentication of a terminal 2 relative to the card 3; the ciphering and deciphering of exchanges, the signature of exchanges.

In addition, the security subsystem provides the taking into account of the security requirements in the other subsystems.

The operation of cards 3 or 4 will now be described in greater details.

A card which is in the "out of privacy" state can be in one of the three modes called "standby", "listening" and "active" described hereinunder. In the standby mode, the consumption of the card is reduced to the required minimum to run a time delay with a duration $T_1$, which is the duration of the standby mode.

In the listening mode, the card is listening to an external radio signal, if any, on one or several determined frequency or frequencies or on a determined range of frequencies.

This listening frequency is not necessarily the same as the frequency which will subsequently be used for the communication between the card and the terminal.

The only supplied and active circuits on the card are those requested for the reception and detection of the signal, as well as the flow of a time delay of a duration $T_2$, which is the maximum duration of the listening mode.

In the active mode, all the circuits on the card are supplied.

The respective average consumptions of the card in the standby, listening, and active modes are called Pv, Pe, and Pa and they comply with the inequality Pv<Pe<Pa.

The time delays $T_1$ and $T_2$ durations are so adjusted, on the one hand, so as to minimize consumption and on the other hand so as to be able to answer quickly the solicitation of a terminal.

A card is switched to the standby mode in the following cases. When the card was previously in listening mode, the time delay $T_2$ has elapsed and no signal has been detected. When a communication session with a terminal is abnormally ended. When the communication session is ended for the following reasons. The biometric authentication phase of a user ("match on card") leads to a negative result. The phase selection of a card and an application selection phase leads to discard said card. A transmission error occurs for example when the card get out of the range and such transmission error is declared non-restorable.

A card is switched to the listening mode when it was beforehand in standby mode and the time delay $T_1$ has elapsed.

The card is switched to active mode when it was previously in the listening mode and as soon as the signal of a terminal has been detected in this mode, prior to the ending of the time delay $T_2$. Such time delay is then shut off.

The card is also switched to the active mode when it is introduced into a card reader with contact.

In the absence of an external electromagnetic signal, the card is thus alternatively and regularly switched through a cycle composed of a standby mode with a duration $T_1$ and the listening mode with a duration $T_2$.

In the presence of an external electromagnetic signal, such cycle is interrupted and the card is switched to the active mode.

This operation mode has two aims: on the one hand minimizing the consumption of the card and thus extending the life of the internal power supply (battery), and on the other hand minimizing the electromagnetic radiation to which the user is exposed.

The operation of a system according to the invention will now be described in greater details. In operation, the system according to the invention successively carries out starting a communication session and awakening the card in the environment, authentication of the user, selection of the card to be used and of the application, payment or service transaction, end of the communication session.

These steps will now be successively described.

The communication session according to the invention can be initialized by a specific control (for example pressing a key in a keyboard) performed on the terminal by the card bearer, or the pay desk personnel via a determined gesture of the bearer such as the presentation of his or her hand, or one or several of his or her fingers, on a biometric reader or through the combination of both actions.

This initialization results in having the terminal 2 emit a radio signal also called an awakening signal.

The cards which are located in the terminal environment and which are in listening mode detect this signal and are then switched to the active mode.

Then it is necessary, in order to awake all the cards which are in the range of the reader and which are not in privacy mode, for the terminal to emit this signal for a minimum duration greater than $T_1$.

Two options can be considered. This signal conveys a biometric certificate calculated more particularly from a biometric gauge, itself calculated from the biometric information obtained during the step of the biometric acquisition of the user. This option requires the biometric information acquisition to occur prior to the emission of the signal. This signal conveys no information and is simply intended to awake the cards; the biometric certificate can then be transmitted subsequently.

Figure 4:
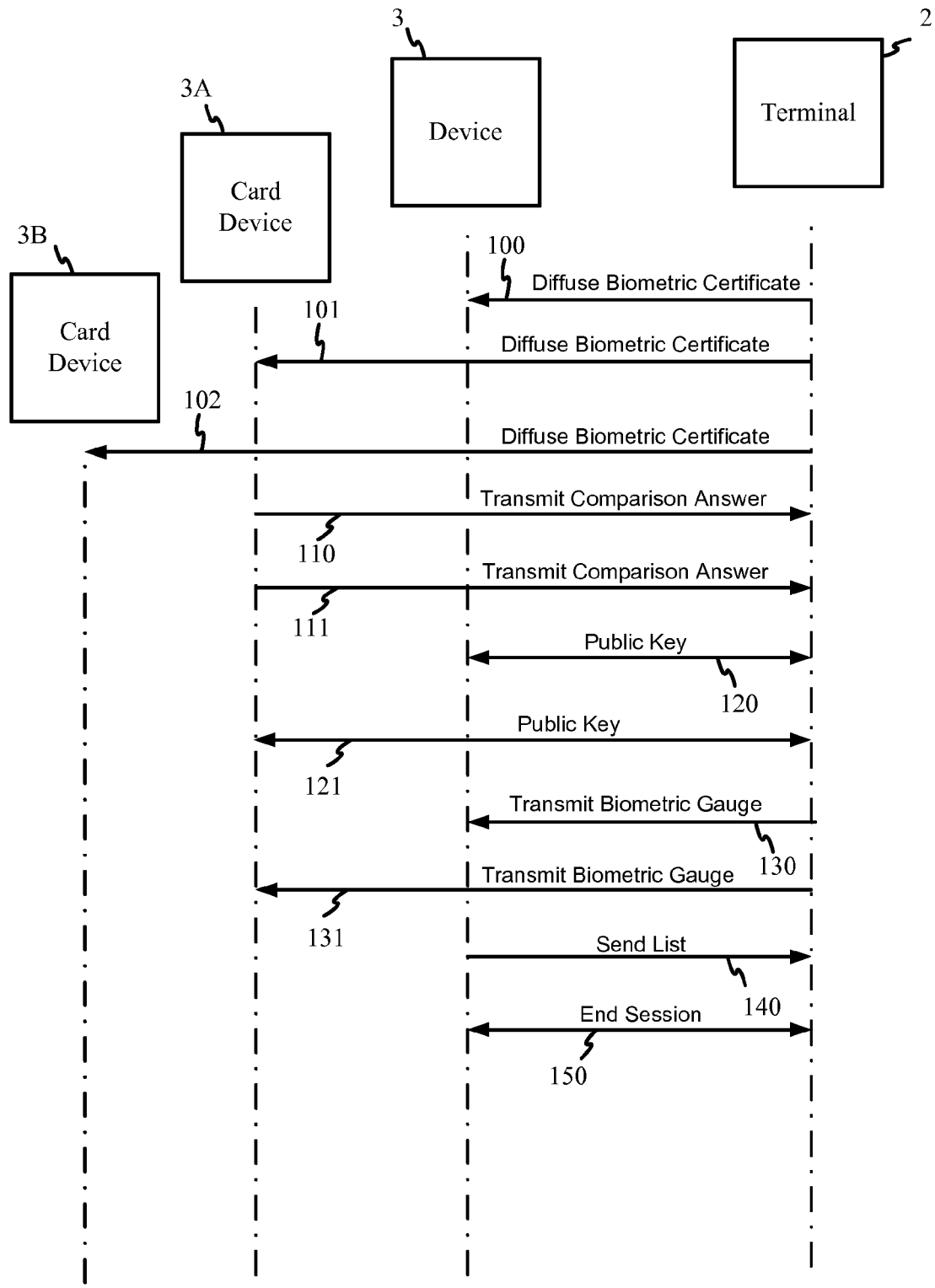
FIG. 4 shows a functional diagram of an embodiment of the system of FIG. 1.

The authentication of the user occurs as follows while referring to FIG. 4.

The authentication is made through a comparison between a biometric gauge calculated by the terminal 2 from the biometric acquisition and a biometric gauge existing on the cards 3, 3A, 3B. Such comparison is made on the card (Match on Card).

The biometric gauge is transmitted from the terminal 2 to the card or cards 3, 3A, 3B in an enciphered way for safety and privacy protection reasons.

Optionally, a step prior to the transmission of the biometric gauge is carried out, with this step consisting for the terminal to transmit a not encoded biometric certificate to the environment cards.

The authentication of the user starts by a determined gesture of the bearer such as the presentation of his or her hand or one or several of his or her fingers on a biometric reader previously activated by the terminal.

This action causes the acquisition of biometric information by the biometric device corresponding to the biometric technology used. This can for example be the fingerprint of one or several fingers or the image of the venous network in the hand or one or several fingers.

It can also result in the calculation of a biometric gauge by the biometric device or by the terminal, generated from the acquired biometric information. This step aims at obtaining a biometric characteristic of the bearer in a reduced size as compared to that of the biometric information and which can thus make it possible to identify the bearer with the requested reliable levels.

Optionally, the terminal can also calculate a biometric certificate, among others from the biometric gauge. Such optional step aims at eliminating for the following part of the process the greatest part of non-eligible cards i.e. those for which the certificate of the biometric gauge stored in the memory does not match the one calculated by the terminal, without however, sending the biometric gauge not encoded.

If the optional step of calculation of the biometric certificate has been carried out, the terminal 2 diffuses 100, 101, 102 this biometric certificate not encoded to the cards in the environment 3, 3A, 3B.

If the cards 3, 3A, 3B located in the environmental terminal have been previously awakened by a signal from the terminal without any information then they switched to the active mode and can receive the new signal from the terminal containing the biometric certificate.

If the cards located in the environment range of the terminal have not been previously awakened by the signal from the terminal without any information then the signal containing the biometric certificate plays the part of the awakening signal. Thus it is necessary for the signal to be transmitted repeatedly for a duration at least equal to $T_1$ (duration of a standby period) so as to wait for the cards to be switched to the listening mode and then to switch them to the active mode.

The cards 3, 3A, 3B thus awakened and located in the range compare the biometric certificate received with the biometric certificate calculated from the biometric gauge stored in their memory or directly with a biometric certificate stored in their memory.

The cards for which this comparison is negative, i.e. for which both certificates are not matched remain silent and are switched back to the standby mode. In FIG. 4, it is assumed that the card 3B runs a negative comparison and thus sends back no positive comparison signal.

The cards 3 and 3A for which this comparison is positive, i.e. those for which both certificates match remain in the active mode and transmit 110, 111 to the terminal 2 a not encoded answer indicating that the comparison is positive.

An exchange of public keys 120, 121 between the terminal 2 and each of the cards 3, 3A which positively answered during the first step. All the cards and all the terminals must thus have a private key/public key couple in memory which is their own, so as to make it possible to open a secured communication terminal between each card and the terminal.

The terminal 2 then transmits 130 and 131 the biometric gauge calculated from the biometric acquisition to all the cards 3, 3A, having answered during the previous step.

These cards decipher the biometric gauge received and compare it with the biometric gauge they have in their memories.

The card or cards for which the comparison is negative remain silent (or optionally they send back to the terminal a negative comparison signal) and switch back to the standby mode. In FIG. 4 it is assumed that the card 3A carried out a negative comparison so that it does not send back a positive comparison signal.

On the contrary the card or cards for which the comparison is positively send back to the terminal a signal of positive comparison and remain in the active mode. In FIG. 4 it is assumed that the card 3 performs such a positive comparison. Optionally, they can send back 140 at the same time as a positive comparison signal the list of the candidate applications they have, so as to prepare the subsequent step of selection of the card and of the application.

The secured communication channel opened for the transmission of the gauge can be used subsequently for the end of the session 150 between the terminal 2 and the card 3 having performed a positive comparison.

The same user can have several cards and each one can include several applications. Similarly, each application can offer several services. In this case, it is required to be able to select the card to be used as well as the application of this card. The selection of the card and the selection of the application are simultaneous and as follows. This step starts with the transmission to the terminal 2 by each card 3 having answered positively to the biometric comparison, of its "Candidate List" i.e. the list of applications it owns.

A selection can thus occur in this list for example by the different following ways which are not exclusive with respect to each other. Elimination of applications not recognized by the terminal. Application of priority rules inside the terminal or existing in the "Candidate List". Selection of the application by an action by the user or the personnel.

Upon completion of this step of selection of the card and the application, only one application is selected, and as the case may be only one service is associated with this application.

Further to the step of selection of the card, of the application, and as the case may be of the service this service must be implemented.

If it is a payment service then it is executed according to the international prevailing bank standards more particularly at the present time: EMV: Europay, Mastercard, Visa.

If it is a service transaction then the execution of the transaction is specific to the considered service.

It is also possible to link several application transactions within the same security transactional terminal. For example a payment can be followed by a loyalty transaction.

If, for any reason, the service transaction cannot be completed, it is considered to have the possibility of returning to the initial state before the transaction.

Upon completion of the payment or service transaction, the card switches back to the standby mode.

What is claimed is:

1. An authentication system including:
a plurality of personal authentication devices; and
a terminal including:
   a memory for storing a private key/public key couple;
   biometric means arranged to generate biometric information on a user;
   wireless communication means arranged to transmit biometric information to each of the plurality of personal authentication devices, without any physical contact, between each of the plurality of personal authentication devices and the terminal;
each of the plurality of personal authentication devices including:
   a memory arranged to store biometric data on a holder of a respective personal authentication device of the plurality of personal authentication devices, a plurality of applications relating to the respective personal authentication device, and a private key/public key couple;
   processing means arranged to compare the biometric information on the user and the biometric data on the holder of the respective personal authentication device to perform an authentication of the user; and
   wireless communication means arranged to transmit, without any contact, at least one of to or from the terminal positive authentication data in response to a positive comparison between the biometric information on the user and the biometric data on the holder of the respective personal authentication device enabling authentication of the user,
wherein the terminal and the plurality of personal authentication devices are arranged so that:
   each of the plurality of personal authentication devices and the terminal exchange public keys in order to open a respective secured communication channel between each of the plurality of personal authentication devices and the terminal;
   the terminal transmits the biometric information to each of the plurality of personal authentication devices through the respective secured communication channel;
   each of the plurality of personal authentication devices compares the biometric information with its biometric data and transmits to the terminal positive authentication data through the respective secured communication channel in response to a positive comparison between the biometric information and the biometric data enabling the authentication of the user; and
   the terminal selects one of the plurality of personal authentication devices that transmitted to the terminal the positive authentication data as a function of the plurality of applications relating to the respective personal authentication device, to perform a transaction with the respective personal authentication device,
wherein the biometric information and the biometric data are biometric gauges enabling authentication of the user and wherein, before opening of respective secured communication channels between the terminal and each of the plurality of personal authentication devices, the terminal and each of the plurality of personal authentication devices are arranged so that:
   the terminal calculates a biometric certificate from its biometric gauge;
   the terminal diffuses said biometric certificate to each of the plurality of personal authentication devices; and
   each of the personal authentication devices calculates a biometric certificate from its biometric gauge, compares the calculated biometric certificate with the biometric certificate diffused by the terminal and, if both biometric certificates match, transmits to the terminal a not encoded answer indicating that the comparison is positive.

2. The system according to claim 1, wherein each of the plurality of personal authentication devices has:
a first mode, wherein each of the plurality of personal authentication devices do not transmit data to the terminal, and
an active mode, wherein each of the plurality of personal authentication devices communicate with the terminal.

3. The system according to claim 2, wherein, in response to a negative comparison between the biometric information on the user and the biometric data on the holder of the respective personal authentication device, the respective personal authentication device is arranged to switch to the first mode.

4. The system according to claim 2, wherein, in response to the positive comparison between the biometric information on the user and the biometric data on the holder of the respective personal authentication device, the respective personal authentication device is arranged to remain in the active mode.

5. The system according to claim 4, wherein each of the plurality of personal authentication devices has:
   a listening mode, wherein each of the plurality of personal authentication devices detect a signal transmitted by the terminal, and
   a standby mode, wherein each of the plurality of personal authentication devices run a time delay.

6. The system according to 5, wherein each of the plurality of personal authentication devices are arranged to switch from the standby mode to the listening mode after a first predetermined time $T_1$.

7. The system according to claim 6, wherein each of the plurality of personal authentication devices are arranged to switch from the listening mode to the active mode when each of the plurality of personal authentication devices detect the signal transmitted by the terminal prior to an end of a second predetermined time $T_2$.

8. The system according to claim 1, wherein the biometric means include a biometric reader arranged to acquire a biometric image of the user and processing means arranged to generate the biometric information on the user from the biometric image.

9. The system according to claim 8, wherein the processing means of the biometric means are arranged to retrieve minutiae from the biometric image and wherein the biometric information on the user includes a condensate of the minutiae.

10. The system according to claim 1, wherein the biometric means include a biometric reader arranged to acquire an image of a venous network of a finger or a hand of the user.

11. The system according to claim 1, wherein the wireless communication means of the terminal are arranged to transmit the biometric information on the user to each of the plurality of personal authentication devices according to a distance contained between 50 centimeters and 300 centimeters.

12. The system according to claim 1, wherein the wireless communication means of each of the plurality of personal authentication devices are able to communicate with the terminal according to a distance contained between 50 centimeters and 300 centimeters.

13. A method of authentication, comprising:
   exchanging public keys between each of a plurality of personal authentication devices and a terminal in order to open a respective secured communication channel between each of the plurality of personal authentication devices and the terminal;
   generating, by a biometric means, biometric information on a user;
   transmitting, by a wireless communication means of a terminal, the biometric information on the user to each of the plurality of personal authentication devices through the respective secured communication channel;
   comparing, by a processing means of each of the plurality of personal authentication devices, the biometric information of the user and biometric data of a holder of each respective personal authentication device of the plurality of authentication devices and generating positive authentication data in response to a positive comparison between the biometric data of the user and the biometric information of the holder to identify the user;
   transmitting, by a wireless communication means of each respective personal authentication device, to the terminal the positive authentication data in response to the positive comparison through the respective secured communication channel;
   opening, by the terminal, a transactional session with each respective personal authentication device having transmitted the positive authentication data;
   requesting, by the terminal, a list of a plurality of applications of each respective personal authentication device with which it opened the transactional session; and
   selecting, by the terminal, a selected one of the plurality of personal authentication devices as a function of the list of the plurality of applications included in the selected one of the plurality of personal authentication devices, to perform a transaction, wherein the selecting includes one or more steps selected from the group consisting of:
      deleting applications not recognized from each received list of the plurality of applications;
      applying rules of priority inside the terminal or existing in each received list of the plurality of applications;
      providing a selection of the selected one of the plurality of personal authentication devices and a selected one of the plurality of applications of the selected one of the plurality of personal authentication devices through an action by the user or the selected one of the plurality of personal authentication devices;
      enabling the authentication of the user via the biometric information and the biometric data as biometric gauges before opening of respective secured communication channels between the terminal and each of the plurality of personal authentication devices;
      calculating a biometric certificate from its biometric gauge via the terminal;
      diffusing said biometric certificate to each of the plurality of personal authentication devices via the terminal; and
      each of the personal authentication devices calculating a biometric certificate from its biometric gauge, comparing the calculated biometric certificate with the biometric certificate diffused by the terminal and, if both biometric certificates match, transmitting to the terminal a not encoded answer indicating that the comparison is positive.

14. The system according to claim 1, wherein each of the plurality of personal authentication devices includes a list of the plurality of applications and the terminal selects the selected one of the plurality of personal authentication devices and a selected one of the plurality of applications of the selected one of the plurality of personal authentication devices to perform a transaction by at least one of steps of eliminating applications not recognized by the terminal from each received list of the plurality of applications, or applying rules of priority inside the terminal or existing in each received list of the plurality of applications.

* * * * *